United States Patent [19]

Balliello

[11] Patent Number: 4,507,126
[45] Date of Patent: Mar. 26, 1985

[54] COLD WATER DISPERSIBLE DYESTUFF GRANULATES

[75] Inventor: Paolo Balliello, Rheinfelden, Fed. Rep. of Germany

[73] Assignee: Ciba-Geigy Corporation, Ardsley, N.Y.

[21] Appl. No.: 606,078

[22] Filed: May 1, 1984

[30] Foreign Application Priority Data

May 4, 1983 [CH] Switzerland ............ 2426/83

[51] Int. Cl.³ .................................. D06P 67/02
[52] U.S. Cl. ...................... 8/526; 8/499; 8/524; 8/597; 8/650; 8/918
[58] Field of Search ........... 8/526, 524, 597, 650

[56] References Cited

U.S. PATENT DOCUMENTS 4,465,491  8/1984  Balliello et al. .............. 8/524

Primary Examiner—A. Lionel Clingman
Attorney, Agent, or Firm—Edward McC. Roberts; Kevin T. Mansfield

[57] ABSTRACT

The invention relates to dyestuff granulates which comprise at least one water-insoluble dye, an anionic dispersant and optionally other auxiliaries, which granulates contain as essential component at least one amphoteric surfactant. Such granulates have, inter alia, excellent cold water dispersibility and good wettability. They are used for preparing dyebaths, padding liquors or printing pastes for dyeing and printing textile material.

10 Claims, No Drawings

COLD WATER DISPERSIBLE DYESTUFF GRANULATES

The present invention relates to cold water dispersible dyestuff granulates, to a process for their preparation, and to the use thereof for dyeing textile materials.

Surprisingly, it has been found that the cold water dispersibility of granulates of water-insoluble dyes can be very substantially enhanced by the addition of amphoteric surfactants. Accordingly, the present invention provides cold water dispersible dyestuff granulates which comprise at least one water-insoluble dye, an anionic dispersant and optionally further auxiliaries, which granulates contain at least one amphoteric surfactant. In this specification, the criterion for cold water dispersibility shall be regarded as met if 5 g of dyestuff granulate can be dispersed in the course of 5 minutes in 50 ml of water of 25°-30° C., under standard mechanical conditions, to leave no residue (MKDL Test).

Suitable water-insoluble dyes are those which have a water-solubility of less than 5 g/l at a temperature of 20° C. Such dyes are in particular disperse dyes, vat dyes, sulfur dyes and pigment dyes which belong chemically to a very wide range of classes. The disperse dyes are e.g. nitro, aminoketone, ketoneimine, methine, polymethine, diphenylamine, quinoline, benzimidazole, xanthene, oxazine, aminonaphthoquinone or coumarin dyes which do not contain carboxylic and/or sulfonic acid groups, and are in particular anthraquinone and azo dyes such as monoazo or disazo dyes. The vat dyes are also dyes which contain neither sulfo nor carboxyl groups in the molecule. The dyes mentioned above are known. However, the granulates can contain mixtures of water-insoluble dyes. The concentration of the dyes in the granulates will vary from from 20 to 80% by weight, based on the total formulation.

If desired, it is possible to add water-soluble dyes to the dyestuff granulates of this invention, e.g. reactive dyes, if it is desired to dye blended fabrics, e.g. polyester/cotton, blends.

Further, throughout this specification, the term "dye" shall also be understood as comprising water-insoluble fluorescent whitening agents. Suitable fluorescent whitening agents are e.g. those which do not contain water-solubilising groups and which belong to the following classes: 2,5-bisbenzoxazolylthiophenes, 1,2-bisbenzoxazolylethylenes, naphthalimides, 2-stilbenylbenzoxazoles, 4,4′-bisvinylstilbenes, 1,4-bisstyrylbenzenes, coumarins, triazinylpyrenes and 1,4-bisbenzoxazolylnaphthalenes.

It is particularly useful to add amphoteric surfactants for spray drying vat dyes.

The anionic dispersants are the dispersants conventionally employed for water-insoluble dyes, e.g. condensates of aromatic sulfonic acids with formaldehyde. However, lignosulfonates are particularly suitable, e.g. the compounds obtainable as sulfite lye. It is also possible to use mixtures of these dispersants. The granulates of this invention will normally contain 10 to 70% by weight of anionic dispersant.

In addition, the granulates can contain further conventional auxiliaries of commercial formulations, e.g. extenders such as dextrin, urea, sugar cane or inorganic salts such as sodium chloride or sodium sulfate, as well as surface-active substances such as ethoxylated or sulfonated or sulfated organic compounds, i.e. nonionic or anionic surfactants, e.g. nonyl phenol pentadecaglycol ether, nonyl phenol diglycol ether sulfate or dodecyl benzenesulfonate.

By amphoteric surfactants are meant those compounds which, depending on the pH value, have anionic or cationic character in aqueous solution and form inner salts close to the isoelectric point. According to Moore, the amphoteric surfactants are divided into ampholytes and betains [q.v. J. Soc. Cosmetic Chemists 11, 13 (1960)].

It has been found that the amphoteric surfactants of the betain type are particularly suitable for improving the cold water dispersibility of water-insoluble dyes, especially the amphoteric surfactants of the formula I

wherein the radicals $R_1$ to $R_3$ and the bridge member X have the following meanings:

$R_1$ and $R_3$ are each independently a $C_1$-$C_4$alkyl radical, $R_2$ is a $C_1$-$C_{20}$alkyl radical which is unsubstituted or substituted by hydroxy, acetylamino, lower alkoxy (e.g. methoxy or ethoxy) or halogen, X is a $C_1$-$C_3$ alkylene radical which is unsubstituted or substituted by a $C_5$-$C_{20}$alkyl radical.

A particularly effective amphoteric surfactant is betain itself ($R_1$, $R_2$ and $R_3$=methyl, X=methylene), which is used as anhydride, hydrochloride or also monohydrate, in some cases as potassium or sodium salt. In addition to betains of the formula I, suitable betains are also for example those which contain a sulfo group (sulfobetains) or sulfato group (sulfatobetains) instead of the carboxyl group.

The granulates can also contain a mixture of two or more amphoteric surfactants. Preferably they will contain 0.5 to 15% by weight, most preferably 8 to 13% by weight, of amphoteric surfactant.

The dyestuff granulates are prepared by suspending one or more water-insoluble dyes with an anionic dispersant, at least one amphoteric surfactant and optionally further auxiliaries in water and spray drying the suspension so obtained. For spray drying or spray granulating, the dyestuff suspension containing the auxiliaries is charged into the drier via a device suitable for producing drops of the desired size (e.g. a jet, atomiser, vibrating feeder or rotating disc). The gas inlet temperature of the drier is in the range from 130° to 200° C., and the gas outlet temperature is in the range from 100° to 150° C. Drying is carried out such that the temperature of the product does not exceed a specific critical value above which the dyestuff granulate undergoes irreversible changes.

The dyestuff suspension can be subjected to a grinding procedure before it is spray dried, for example in a stirred ball mill or sand mill. If the suspension is ground, it is also possible to add some of the components after the grinding procedure.

The dye to be granulated can be employed e.g. as dry product or as filter cake, or also direct as suspension from the last synthesis step, e.g. after coupling.

The dyestuff granulates of this invention have the following properties:

excellent cold water dispersibility—dispersing time<5 minutes;

good wettability;
homogeneous gradual water absorption, therefore virtually no propensity to form lumps;
non-foaming;
homogeneous particle size distribution;
free-flowing;
non-dusting.

The dyestuff granulates of the invention are used for preparing dyebaths, padding liquors or printing pastes suitable in particular for dyeing or printing textile material, e.g. material made from natural cellulose fibres.

The invention is illustrated by the following Examples, in which parts and percentages are by weight.

EXAMPLE 1

1000 parts of powdered sulfite lye are mixed with 4082 parts of the dye of the formula

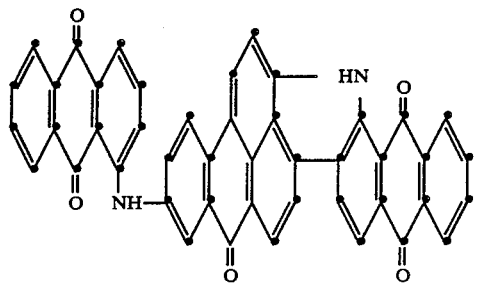

as 25% filter cake. To this mixture are added 604 parts of powdered sulfite lye and 348 parts of betain anhydride.

This mixture is then suspended in 1335 parts of water. The suspension so obtained with a solids content of about 40% is subjected to wet grinding until the primary particle size of the dyes is less than or equal to 1 μm. The dyestuff dispersion is then filtered to remove separate coarse particles still present, adjusted to a solids content of about 25% by adding water—the viscosity of the dispersion is 30 cP at 25° C.—and finally spray dried. A monofluid nozzle is used as sprayer. The air inlet temperature is 132° C. and the air outlet temperature is 110° C. The spray drying is controlled such that the residual moisture of the granulates is about 7%.

The granulate so obtained has the following composition:
31.5% of dye of the indicated formula
11.0% of betain
50.5% of powdered sulfite lye
7.0% of residual moisture.

The granulate has a cold water dispersibility of 100 g/l (i.e. 5 g/50 ml in the MKDL Test) in a dispersing time of 2 to 3 minutes. A dispersing time of 18 to 20 minutes is required in order to disperse in 1 liter of water the same amount of a corresponding granulate which has been prepared without the addition of betain. At the outset the suspension is viscous and the dye can be homogeneously dispersed only slowly.

EXAMPLES 2 TO 5

The procedure described in Example 1 is repeated and the vat dyes listed in column 2 of the following Table, together with dispersant and amphoteric surfactant (in the respective amounts indicated in column 3), are spray granulated to give dyestuff formulations of the composition indicated in column 4, which also have good cold water dispersibility.

| Example | Dye | Components | Amounts [parts] | Composition of the granulate [% by weight] |
| --- | --- | --- | --- | --- |
| 2 | C.I. Vat Black, C.I. 69005 | dye | 1000 | 37.2 |
|  |  | condensate of naphthalene sulfonic acid and formaldehyde | 1424 | 53.0 |
|  |  | betain anhydride | 130 | 4.8 residual moisture 5 |

| Example | Dye | Components | Amounts [parts] | Composition of the granulate [% by weight] |
|---|---|---|---|---|
| 3 | 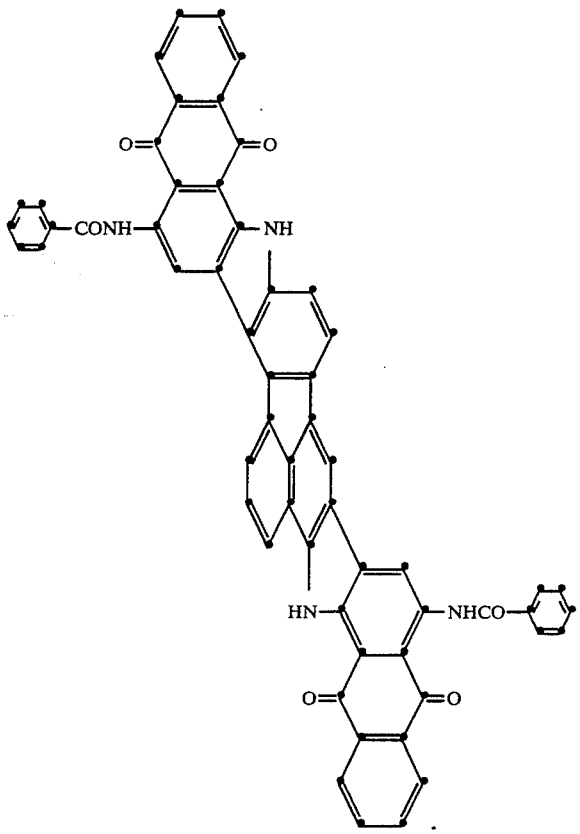 | dye<br>condensate of naphthalene-sulfonic acid and formaldehyde<br>betain anhydride | 1000<br>2000<br><br><br>166 | 30<br>60<br><br><br>5<br>residual moisture 5 |
| 4 | C.I. Vat Blue 19, C.I. 59805 | dye<br>condensate of naphthalene sulfonic acid and formaldehyde<br>betain anhydride | 1000<br>1690<br><br><br>142 | 33.5<br>56.7<br><br><br>4.8<br>residual moisture 5 |
| 5 | 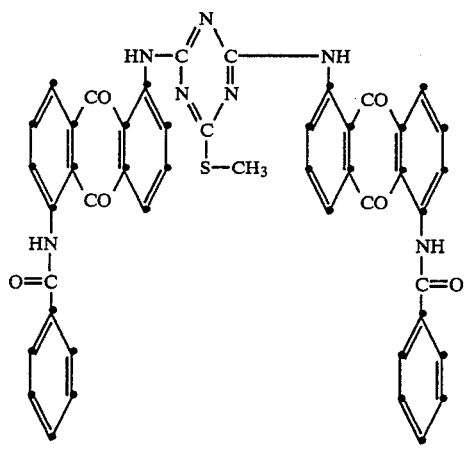 | dye<br>condensate of naphthalenesulfonic acid and formaldehyde<br>betain anhydride | 1000<br>976<br><br><br>71.1 | 46.4<br>45.3<br><br><br>3.3<br>residual moisture 5 |

EXAMPLE 6

2000 parts of the fluorescent whitening agent of the formula

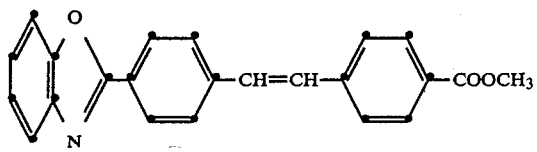

are mixed with 1000 parts of a naphthalenesulfonic acid/formaldehyde condensate and 133.3 parts of betain anhydride. The mixture is then suspended in 600 parts of water and subjected to wet grinding until the primary particle size of the fluorescent whitening agent is <5 μm. A small amount of coarse particles is removed by filtration and the whitener suspension containing the auxiliaries is spray granulated as described in Example 1.

A formulation which is readily dispersible in cold water and has the following composition is obtained:
60% of fluorescent whitening agent
30% of naphthalenesulfonic acid/formaldehyde condensate
4% of betain anhydride
6% of residual moisture.

Readily wettable granulates which can be dispersed without forming any residue are also prepared by granulating the following fluorescent whitening agents as described above:

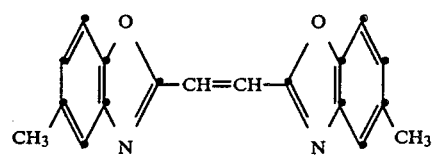

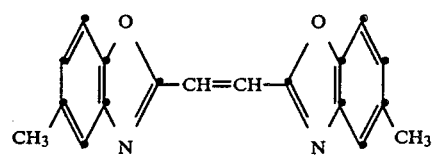

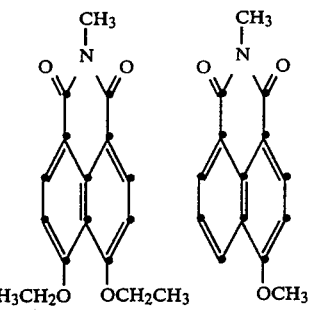

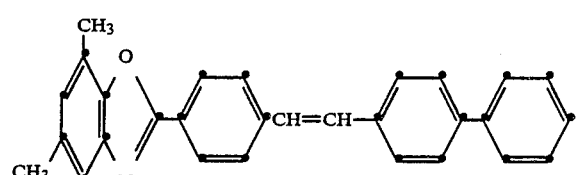

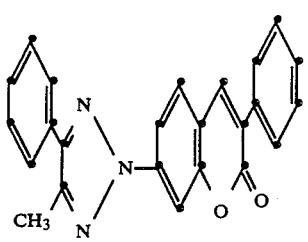

-continued

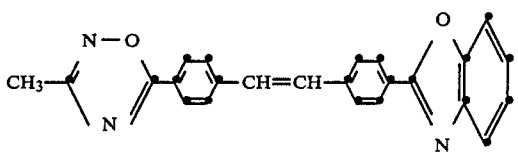

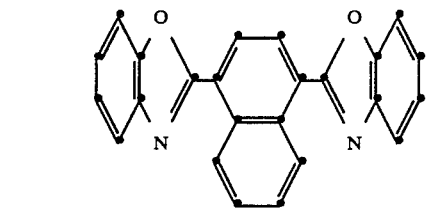

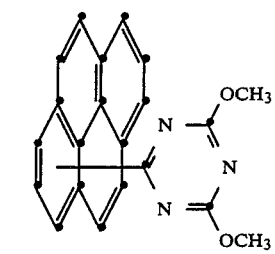

MECHANICAL TEST TO DETERMINE THE COLD WATER DISPERSIBILITY/SOLUBILITY (MKDL TEST)

5 g of dyestuff granulate are placed on a perforated steel disc which is kept horizontal by means of a lifting mechanism in a 100 ml glass beaker filled with 50 ml of demineralised water. The steel disc has 68 perforations of 3 mm diameter and its own diameter is such that it barely touches the sides of the glass beaker. The temperature of the water is 25°–30° C. After waiting for 30 seconds until the dyestuff granulate has deposited onto the immersed steel disc, the lifting mechanism is then set in motion (30 lifts/min, lifting height 35 mm, dead centre lies above the surface of the water). The steel disc is observed while measuring the time until no more dye can be detected on the disc.

The dispersing time is determined in accordance with the following rating, which is based on the requirements of practice:
up to 5 minutes = good
5 to 10 minutes = moderate
<10 minutes = poor.

What is claimed is:

1. A cold water dispersible dyestuff granulate which comprises at least one water-soluble dye, an anionic dispersant and optionally further auxiliaries, which granulate contains at least one amphoteric surfactant.

2. A dyestuff granulate according to claim 1, which contains a compound of the betain type as amphoteric surfactant.

3. A dyestuff granulate according to claim 2, wherein the amphoteric surfactant is a betain of the formula I,

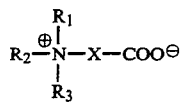

wherein each of
$R_1$ and $R_3$ independently of the other is a $C_1$—$C_4$ alkyl radical, $R_2$ is a $C_1$-$C_{20}$ alkyl radical which is unsubstituted or substituted by hydroxy, acetylamino, lower alkoxy or halogen, and X is a $C_1$-$C_3$-alkylene radical which is unsubstituted or substituted by $C_5$-$C_{20}$-alkyl.

4. A dyestuff granulate according to claim 3, which contains a betain of the formula I, wherein $R_1$, $R_2$ and $R_3$ are methyl and X is methylene.

5. A dyestuff granulate according to claim 1, which contains 0.5 to 15% by weight of amphoteric surfactant.

6. A process for the preparation of a dyestuff granulate according to claim 1, which comprises suspending a water-insoluble dye together with an anionic dispersant and an amphoteric surfactant in water, and converting the suspension so obtained into a granulate by spray drying.

7. A process according to claim 6, wherein the dyestuff suspension is subjected to a grinding procedure before being spray dried.

8. A method of preparing a dyebath, padding liquor or printing paste, comprising the step of dispersing a dyestuff granulate of claim 1 in water.

9. A method of dyeing or printing textile material comprising the application thereto of a dyebath, padding liquor or printing paste of claim 8.

10. The method of claim 9 wherein the textile material is cellulosic.

* * * * *